United States Patent
Shudo et al.

(10) Patent No.: US 8,047,962 B2
(45) Date of Patent: Nov. 1, 2011

(54) HYDRAULIC CONTROL DEVICE FOR AUTOMATIC TRANSMISSION

(75) Inventors: Norimasa Shudo, Utsunomiya (JP); Suguru Ishida, Utsunomiya (JP); Masaya Tamai, Utsunomiya (JP); Akihiro Ueki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 231 days.

(21) Appl. No.: 12/466,134

(22) Filed: May 14, 2009

(65) Prior Publication Data

US 2009/0286650 A1 Nov. 19, 2009

(30) Foreign Application Priority Data

May 19, 2008 (JP) ................................. 2008-131319

(51) Int. Cl.
*F16H 61/26* (2006.01)
(52) U.S. Cl. .......................................... 477/127; 91/449
(58) Field of Classification Search ........................ None
See application file for complete search history.

(56) References Cited

U.S. PATENT DOCUMENTS

| | | | | |
|---|---|---|---|---|
| 4,152,970 A | * | 5/1979 | Hall et al. | 91/318 |
| 4,976,169 A | * | 12/1990 | Sasajima et al. | 60/449 |
| 6,110,062 A | | 8/2000 | Fujikawa | |
| 7,128,688 B2 | * | 10/2006 | Katou | 477/98 |
| 2005/0272549 A1 | * | 12/2005 | Carne | 475/116 |

FOREIGN PATENT DOCUMENTS

| | | |
|---|---|---|
| JP | 60-069356 A | 4/1985 |
| JP | 6-53830 U | 7/1994 |
| JP | 8-285059 A | 11/1996 |
| JP | 11-247981 A | 9/1999 |

* cited by examiner

*Primary Examiner* — Justin Holmes
(74) *Attorney, Agent, or Firm* — Arent Fox, LLP

(57) ABSTRACT

A hydraulic control device for an automatic transmission is provided. The hydraulic control device can sets up any gear from a plurality of gears by causing any one of a plurality of frictional engagement elements to selectively carry out an engagement operation. The hydraulic control device includes: a regulator valve that regulates base oil pressure of hydraulic oil supplied from an oil pressure source; a relief valve provided in a lubricating oil passage connected from the regulator valve; and a line pressure switching section that sets up line pressure to low pressure to reduce the amount of lubricating oil in a region in which engagement hydraulic oil pressure does not require high engagement hydraulic oil pressure depending upon an operation state of a vehicle, and sets up the line pressure to high pressure when a target value of the engagement hydraulic oil pressure exceeds predetermined pressure.

4 Claims, 7 Drawing Sheets

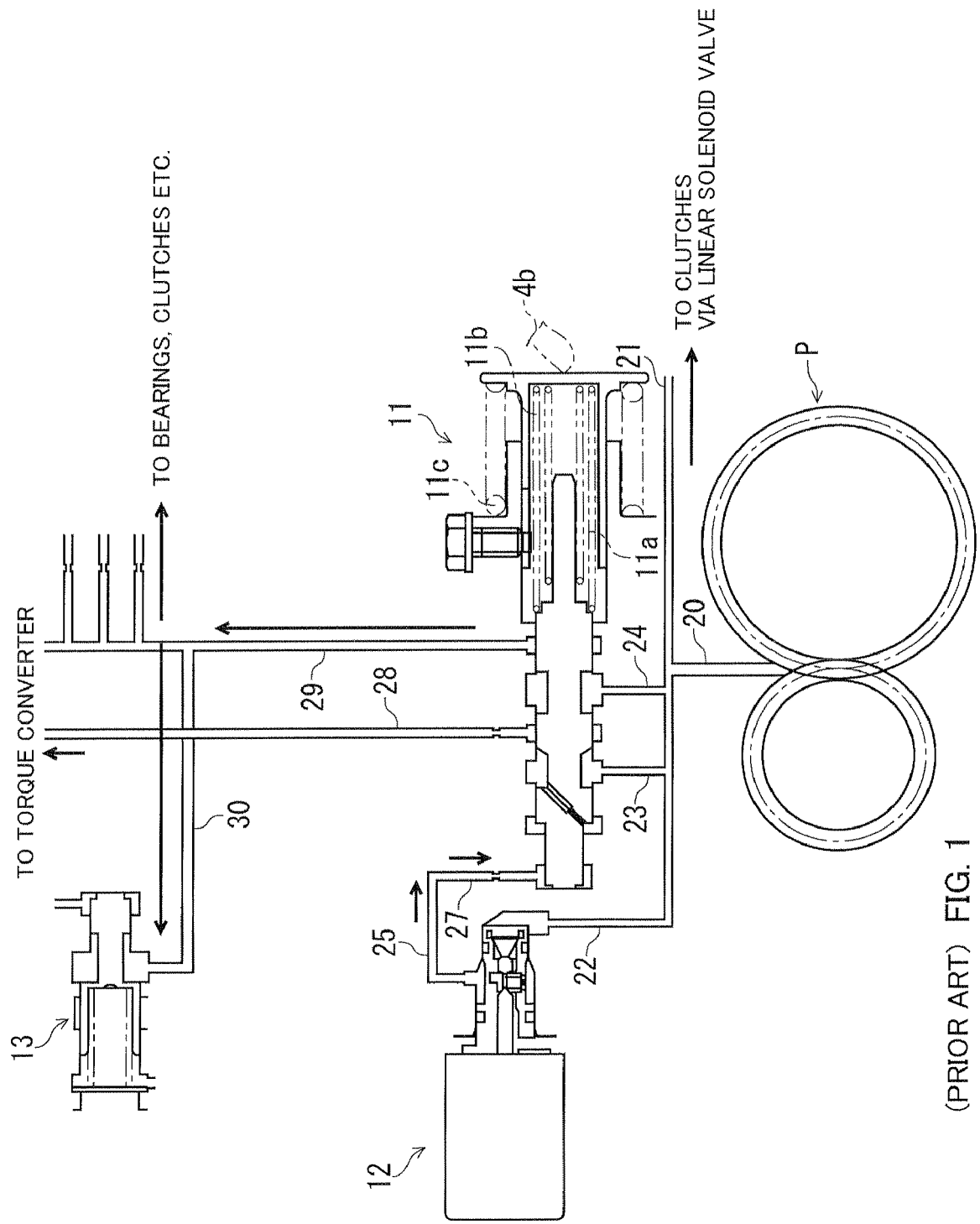
(PRIOR ART) FIG. 1

HYDRAULIC CONTROL DEVICE FOR AUTOMATIC TRANSMISSION

CROSS-REFERENCE TO RELATED APPLICATION

The present disclosure relates to subject matter contained in Japanese Patent Application No. 2008-131319, filed on May 19, 2008, the disclosure of which is expressly incorporated herein by reference in its entirety.

BACKGROUND OF THE INVENTION

1. Field of the Invention

The present invention relates to a hydraulic control device for an automatic transmission of a vehicle, and particularly, the present invention relates to a hydraulic control device for an automatic transmission that can switch line pressure of hydraulic oil between two steps.

2. Description of the Related Art

Heretofore, there is known a hydraulic control device for an automatic transmission that, when a load is applied to the automatic transmission, increases line pressure of a hydraulic circuit on the basis of the load compared with line pressure while stopping of the vehicle in order to improve fuel economy (gas mileage) of a vehicle provided with an automatic transmission (see, for example, Japanese Patent Application Publication No. 60-69356; hereinafter, referred to as "Patent Document 1"). In this vehicle provided with the automatic transmission, it is possible to prevent unnecessary consumption of fuel due to a so-called creep phenomenon while stopping of the vehicle particularly.

Specifically, to be explained with reference to a regulator valve 11 of FIG. 1, in the vehicle with the automatic transmission disclosed in Patent Document 1, an output of an engine is transmitted to a pump impeller of a torque converter via a crank shaft, and torque is amplified in a turbine impeller. A stator impeller shoulders reaction force of this torque. A stator arm 4b for controlling a regulator valve 11 in a hydraulic control device for an automatic transmission is fixed to this stator impeller, and stator reaction force is applied to a spring receiving tube 11b of the regulator valve 11 via this stator arm 4b. When the stator reaction force is increased, a stator spring 11c connected to the spring receiving tube 11b is compressed. The spring receiving tube 11b is moved to the left with this, and a set load for a compression coil spring 11a of the regulator valve 11 is caused to increase, whereby line pressure in a hydraulic oil passage is increased.

In the vehicle with the automatic transmission disclosed in Patent Document 1, by lowering line pressure while stopping of the vehicle, driving torque of an oil pump is reduced and friction torque of the automatic transmission is also reduced, whereby fuel economy of the vehicle can be improved. However, the line pressure can be increased using stator reaction force as described above, but it is impossible to further lower line pressure compared with normal line pressure, to which the stator reaction force is not applied, in a region in which a function and merchantability of the automatic transmission can fully be satisfied even under lower line pressure than normal. For this reason, there has been a problem that it is impossible to further improve fuel economy of a vehicle by further lowering line pressure in such a vehicle with the automatic transmission.

In order to solve this problem, it is thought to utilize a hydraulic control device that can switch (or change) line pressure between two steps by providing a solenoid valve for supplying auxiliary pressure to the regulator valve. FIG. 1 is a part of a hydraulic circuit of a hydraulic control device for an automatic transmission provided with a solenoid valve for supplying auxiliary pressure to a regulator valve. As shown in FIG. 1, this hydraulic control device for an automatic transmission includes: an oil pump P that becomes an oil pressure source; a regulator valve 11 for generating line pressure, which becomes original pressure of engagement hydraulic oil pressure for frictional engagement elements such as a clutch, by regulating base oil pressure of hydraulic oil supplied from this oil pump P; a solenoid valve 12 for supplying auxiliary pressure to the regulator valve 11 to switch line pressure between two steps; and a relief valve 13 that opens to reduce the amount of lubricating oil when oil pressure in a lubricating oil passage (hereinafter, referred to as "lubricating pressure") becomes predetermined pressure. The relief valve 13 is provided in an oil passage 30 that is a lubricating oil passage at an output side of the regulator valve 11.

In the hydraulic control device for the automatic transmission shown in FIG. 1, by switching the line pressure to low pressure in a region in which higher engagement hydraulic oil pressure than that in an operation state of the vehicle is not required, driving torque of the oil pump P is reduced, and friction torque of the automatic transmission is also reduced, whereby improvement of fuel economy can be achieved.

However, as shown in FIG. 2B, when line pressure is set to low pressure, the amount of hydraulic oil leaking from the hydraulic control device falls compared with under high pressure. By lowering the amount of hydraulic oil in this manner, the amount of oil flowing into an oil passage 29, which is a lubricating oil passage, from the regulator valve 11 tends to increase. In particular, in a low input revolution region in which lubricating pressure is predetermined pressure or lower (the state where the relief valve 13 for reducing the amount of lubricating oil is closed), the amount of lubricating oil to clutches increases, and thus, friction torque of the clutches tends to increase. Therefore, even though a solenoid valve is merely added thereto to switch the line pressure to low pressure for the purpose of improving fuel economy, friction torque of the automatic transmission cannot be lowered in the low input revolution region as shown in FIG. 2A. Thus, there has been a problem that as a result, fuel economy cannot be improved in such a case.

SUMMARY OF THE INVENTION

The present invention is made in view of the above points, and it is an object of the present invention to provide a hydraulic control device for an automatic transmission of a vehicle, which can reduce driving torque of an oil pump and reduce friction torque of the automatic transmission by being capable of switching line pressure to low pressure, whereby fuel economy of the vehicle can be improved.

In order to solve the problems described above, a hydraulic control device for an automatic transmission (M) according to the present invention is a hydraulic control device for an automatic transmission for a vehicle, the vehicle including a hydraulic torque converter (T) and an automatic transmission (M) connected to the torque converter (T). In this case, the automatic transmission has a plurality of frictional engagement elements, and the hydraulic control device is capable of setting up any gear from a plurality of gears by causing any of the plurality of frictional engagement elements to selectively carry out an engagement operation. The hydraulic control device for the automatic transmission (M) includes a regulator valve (11) that regulates base oil pressure of hydraulic oil supplied from an oil pressure source (P) on the basis of stator reaction force of the torque converter (T) to generate line pressure, the line pressure becoming original pressure of engagement hydraulic oil pressure for the frictional engagement element.

The hydraulic control device for the automatic transmission (M) also includes a relief valve (13) provided in a lubricating oil passage connected from the regulator valve (11), the relief valve opening to reduce the amount of lubricating oil when oil pressure (lubricating pressure) within the lubricating oil passage becomes predetermined pressure.

The hydraulic control device for the automatic transmission (M) also includes a line pressure switching section (12, 14) that sets up the line pressure to low pressure to reduce the amount of lubricating oil in a region in which the engagement hydraulic oil pressure does not require high engagement hydraulic oil pressure depending upon an operation state of the vehicle, and sets up the line pressure to high pressure when a target value of the engagement hydraulic oil pressure exceeds the predetermined pressure.

According to the hydraulic control device for the automatic transmission of the present invention, for example, even in the case where the number of input revolutions is low in the state where the line pressure is switched to low pressure by means of the line pressure switching section, by reducing the amount of lubricating oil, driving torque of an oil pump that is the oil pressure source can be reduced, and friction torque of the automatic transmission can also be reduced. Therefore, it is possible to improve fuel economy of the vehicle.

In the hydraulic control device for the automatic transmission according to the present invention, it is preferable that in order to switch the line pressure from the high pressure to the low pressure, the line pressure switching section includes: a solenoid valve (12) for supplying auxiliary pressure to the regulator valve (11); and a control valve (14) that operates in accordance with the oil pressure supplied from the solenoid valve (12). In this case, when the line pressure is switched from high pressure to low pressure, auxiliary pressure is added to the regulator valve by opening the solenoid valve, and at the same time, the control valve is caused to operate. Therefore, when the line pressure is switched between two steps, that is, low pressure and high pressure, the amount of lubricating oil can be reduced by causing the control valve to operate even in the case where the relief valve does not open. In this regard, as this control valve of the hydraulic control device, a relief valve or a switching valve (or directional control valve) may be used, for example.

Further, in the hydraulic control device for the automatic transmission according to the present invention, it is preferable that the control valve (14) is provided in the lubricating oil passage, and the control valve (14) opens the lubricating oil passage to reduce the amount of lubricating oil by operating by means of the solenoid valve (12) when the line pressure is low pressure. Alternatively, the control valve (14) may be provided in a line pressure oil passage that lies upstream of the lubricating oil passage via the regulator valve (11), and the control valve (14) may open the line pressure oil passage to reduce the amount of lubricating oil by operating by means of the solenoid valve (12) when the line pressure is low pressure. Alternatively, in the hydraulic control device for the automatic transmission according to the present invention, the control valve (14) may be provided in the lubricating oil passage, the control valve (14) has two output ports at one of which an orifice (40) is provided, and the control valve (14) may supply the lubricating oil from the output port at which the orifice (40) is provided to reduce the amount of lubricating oil by operating by means of the solenoid valve (12) when the line pressure is low pressure. Thus, since the amount of lubricating oil can be reduced when the line pressure is low pressure, driving torque of the oil pump can be reduced, and friction torque of the automatic transmission can also be reduced. Therefore, it is possible to improve fuel economy of the vehicle.

In this regard, reference numerals in parenthesis described above exemplify, for reference, corresponding components of embodiments (will be described later).

According to the present invention, in a region in which engagement hydraulic oil pressure does not require high engagement hydraulic oil pressure depending upon an operation state of the vehicle, by switching the line pressure generated by the regulator valve to low line pressure, driving torque of the oil pump can be reduced, and friction torque of the automatic transmission can also be reduced. Therefore, it is possible to improve fuel economy of the vehicle.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings:

FIG. 1 is a part of a hydraulic circuit diagram of a hydraulic control device for an automatic transmission in which a solenoid valve is added to a conventional hydraulic control device for an automatic transmission;

DETAILED DESCRIPTION OF THE INVENTION

Hereinafter, preferred embodiments of a hydraulic control device for an automatic transmission according to the present invention will be described in detail with reference to the appending drawings.

First Embodiment

A first embodiment of a hydraulic control device for an automatic transmission according to the present invention will first be described.

Figure 3:
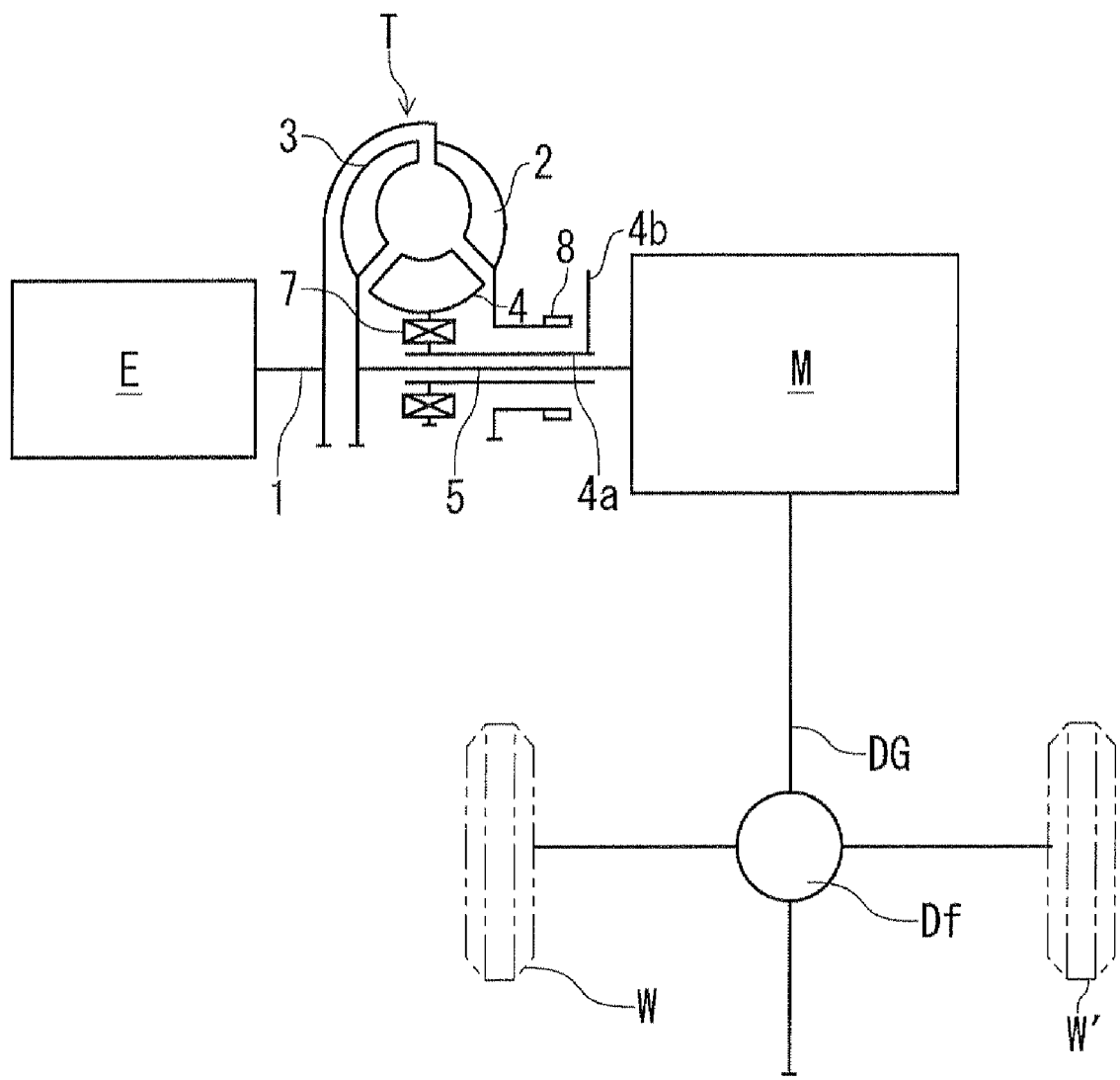
FIG. 3 is a schematic view of a vehicle to which a hydraulic control device for an automatic transmission according to the present invention is applied.

FIG. 3 is a schematic view of a vehicle to which a hydraulic control device for an automatic transmission according to the present invention is applied. As shown in FIG. 3, this vehicle is provided with: an engine E; a hydraulic torque converter T connected to this engine E; an automatic transmission M connected to the torque converter T; a differential Df and the like. In this regard, the hydraulic control device for the automatic transmission according to the present invention is provided in the automatic transmission M. An output of the engine E is in turn transmitted to the torque converter T, the automatic transmission M and the differential Df via the crank shaft 1, and is finally transmitted to driven wheels W, W'.

As shown in FIG. 3, the torque converter T is constructed from: a pump impeller 2 connected to the crank shaft 1 of the engine E; a turbine impeller 3 connected to an input shaft 5 of the automatic transmission M; and a stator impeller 4 connected to a stator shaft 4a via a one-way clutch 7. The stator shaft 4a is supported on the input shaft 5 rotatably relative to the input shaft 5. Torque transmitted from the crank shaft 1 to the pump impeller 2 is hydrodynamically transmitted to the turbine impeller 3, and an amplification function of the torque is carried out between these. At this time, the stator impeller 4 shoulders reaction force of the torque (hereinafter, referred to as "stator reaction force").

Figure 4:
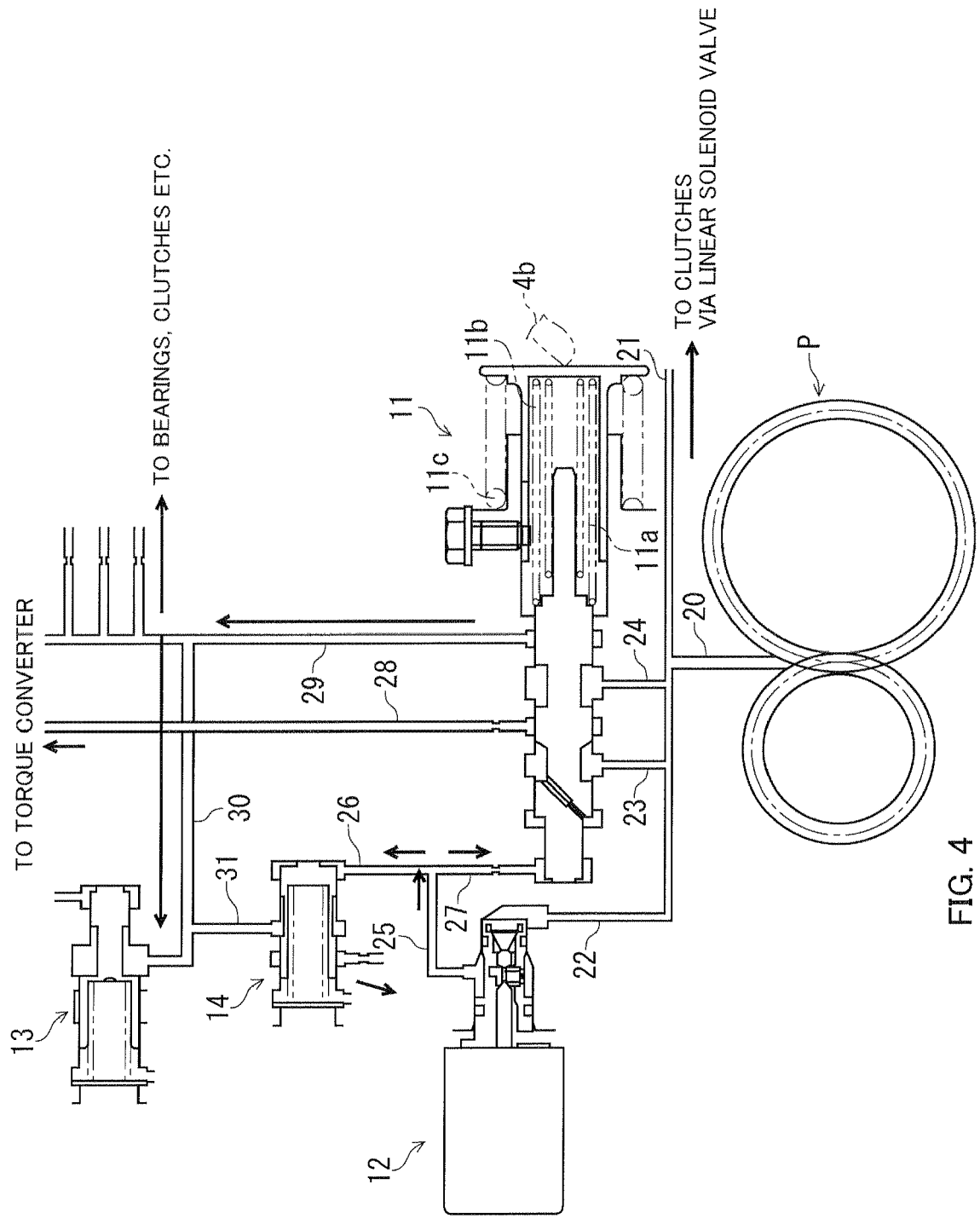
FIG. 4 is a part of a hydraulic circuit diagram of the hydraulic control device for the automatic transmission according to a first embodiment of the present invention.

In FIG. 3, a pump drive gear 8 for driving an oil pump P shown in FIG. 4 is provided at a right end of the pump impeller 2. A stator arm 4b for controlling a regulator valve 11 shown in FIG. 4 under high line pressure is provided at a right end of the stator shaft 4a.

In the present embodiment, the automatic transmission M is an automatic transmission for a vehicle having five forward gears and one reverse gear, for example. A plurality of gear trains and a plurality of clutches (frictional engagement elements) are provided in the automatic transmission M so as to correspond to the respective gears. Each of the gear trains is constructed from a pair of drive gear and driven gear. Since a configuration of the automatic transmission M is not a feature of the present invention, detailed description thereof using a skeleton diagram or the like is omitted. However, a person having ordinary skill in the art can adopt any configuration of known automatic transmissions appropriately.

FIG. 4 is a part of a hydraulic circuit diagram of the hydraulic control device for the automatic transmission according to the first embodiment of the present invention. As shown in FIG. 4, the hydraulic control device for the automatic transmission according to the first embodiment differs from the hydraulic control device for the automatic transmission shown in FIG. 1 in view of a point that a control valve 14 is added. In this regard, the same reference numerals are assigned to components, oil passages and the like similar to those of the hydraulic control device for the automatic transmission of FIG. 1. As described above, in the case where only a solenoid valve 12 for supplying auxiliary pressure to a regulator valve 11 is provided in order to switch line pressure from high pressure to low pressure, a relief valve 13 remains closing when the number of input revolutions is low under low line pressure. In the case where the amount of hydraulic oil leaking from the hydraulic control device is lowered, the amount of lubricating oil flowing into respective bearings and clutches and the like via an oil passage 29 tends to increase accordingly. Therefore, when the number of input revolutions is low, friction torque of the automatic transmission is increased, and as a result, it is impossible to expect improvement of fuel economy in such a region.

In the hydraulic control device for the automatic transmission according to the present embodiment, the control valve 14 is provided in a lubricating oil passage. The lubricating oil passage is actively switched to open under low line pressure in which the relief valve 13 does not open, whereby the amount of lubricating oil is reduced. Specifically, as shown in FIG. 4, the control valve 14 is provided in parallel to the relief valve 13 through oil passages 29, 30, 31 that are lubricating oil passages. The control valve 14 opens and closes by receiving hydraulic oil (signal pressure of low line pressure) supplied from the solenoid valve 12 through oil passages 25, 26. In this regard, by providing the solenoid valve 12, steps are added to the regulator valve 11, whereby the line pressure can be switched between two steps of high line pressure and low line pressure by switching a pressure receiving area of the regulator valve 11. Here, as the control valve 14, a relief valve or a switching valve (or directional control valve) may be used, for example.

An oil pump P suctions hydraulic oil from an oil tank (not shown in the drawings) to pump the suctioned hydraulic oil to an oil passage 20. This oil pressure is regulated to predetermined pressure by means of the regulator valve 11, and the regulated hydraulic oil is then fed to the respective clutches through an oil passage 21 and valves (not shown in the drawings) via linear solenoid valves. Here, when it becomes a region in which high engagement hydraulic oil pressure is not required, the hydraulic oil pressure of the hydraulic oil supplied from the oil pump P is received with an oil passage 22, and the solenoid valve 12 is opened (ON) in response to control of an electronic control unit (ECU; not show in the drawings) of the vehicle. Open of this solenoid valve 12 causes the regulator valve 11 to be controlled by the hydraulic oil fed through the oil passages 25, 27 (signal pressure of the low line pressure) and the hydraulic oil fed through an oil passage 23. By making the pressure receiving area of the regulator valve 11 larger, the line pressure regulated by means of the regulator valve 11 is switched to low pressure.

In this case, the control valve 14 is controlled via an oil passage 26 by signal pressure of the low line pressure, whereby this control valve 14 is operated so as to open an oil passage 31 that is a lubricating oil passage. Further, the hydraulic oil whose pressure is switched to the low line pressure is supplied from the regulator valve 11, is fed through oil passages 29, 30 and 31 that are lubricating oil passages, and is drained from the control valve 14 thus opened. Thus, even in the state where the line pressure is low and the relief valve 13 is not thereby opened, the amount of lubricating oil supplied to the respective bearings and clutches can be reduced to the same degree as under high line pressure.

Further, when it becomes a region in which high engagement hydraulic oil pressure is required, the hydraulic control device for the automatic transmission according to the present embodiment carries out an operation to switch the line pressure from low pressure to high pressure. In this case, by closing the solenoid valve 12 in response to control of the electronic control unit (not shown in the drawings), the hydraulic oil (signal pressure of the low line pressure) is not supplied to the oil passages 25, 27, and the regulator valve 11 is controlled by only the hydraulic oil fed through the oil passage 23. This makes the pressure receiving area of the regulator valve 11 smaller, whereby the line pressure is switched from low pressure to high pressure. Similarly, at this time, the hydraulic oil (signal pressure of the low line pressure) is not also supplied to the oil passage 26. Thus, the control valve 14 is closed, whereby open of the lubricating oil passage through the oil passage 31 is stopped. In this regard, when the number of input revolutions is high, oil pressure in the lubricating oil passage (hereinafter, referred to as "lubricating pressure") becomes predetermined pressure. For this reason, the relief valve 13 is opened, whereby the amount of lubricating oil is also reduced under high line pressure.

In this regard, when the line pressure is high pressure, the regulator valve 11 regulates base oil pressure of the hydraulic oil supplied from the oil pump P on the basis of stator reaction force of the torque converter T, and generates high line pressure that becomes original pressure of the engagement hydraulic oil pressure for the clutches, which are the frictional engagement elements. Specifically, the stator reaction force is directly applied to a spring receiving tube 11b of the regulator valve 11 via the stator arm 4b provided on the stator shaft 4a. When the stator reaction force is increased, a stator spring 11c connected to the spring receiving tube 11b is compressed, and a set load of a compression coil spring 11a of the regulator valve 11 is caused to increase, whereby the line pressure in a hydraulic oil passage is increased.

Figures 2A, 2B:
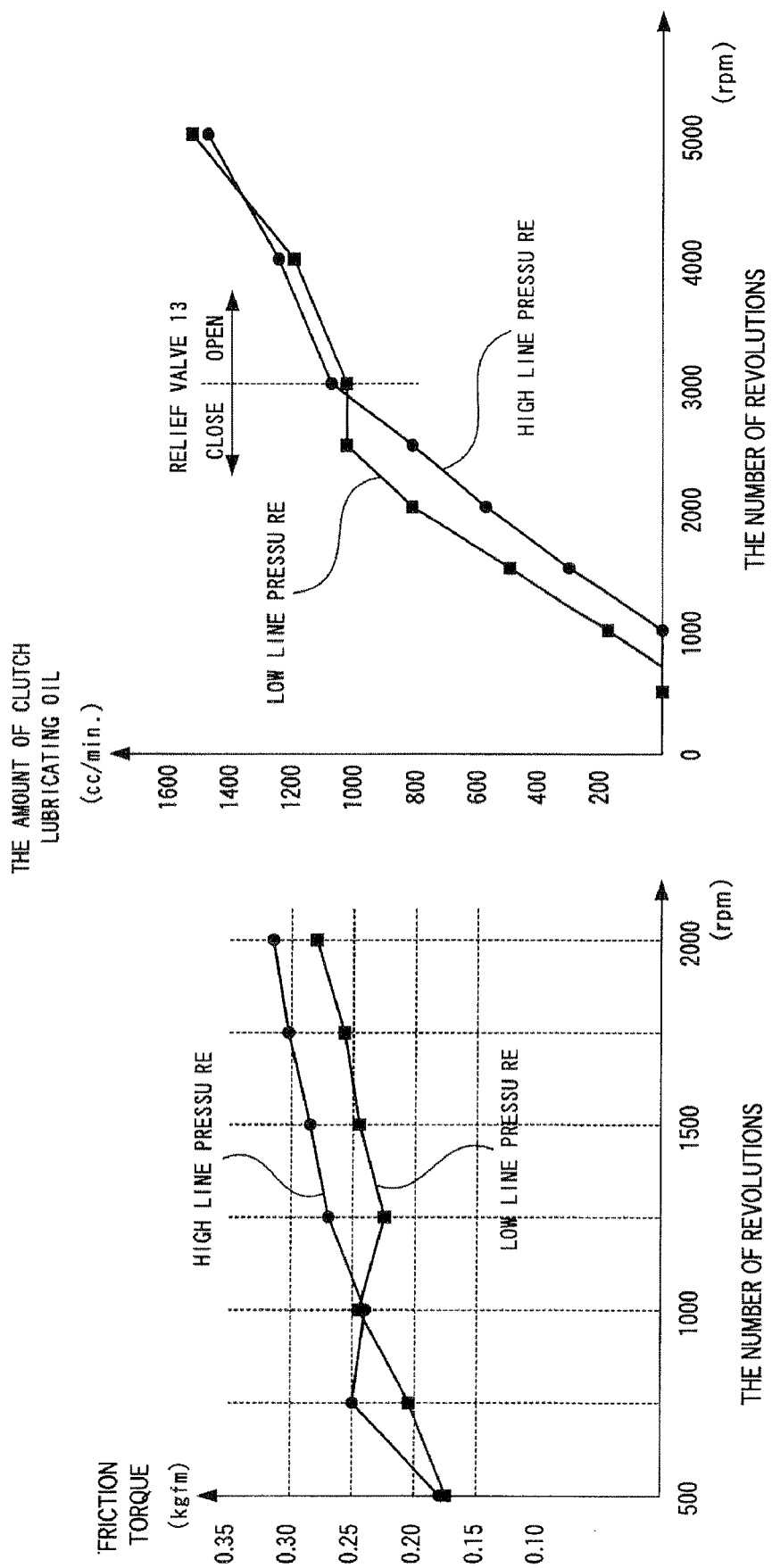
FIG. 2 is a graph showing a relation between the number of input revolutions, transmission friction torque and the amount of clutch lubricating oil in the conventional automatic transmission.
Figures 5A, 5B:
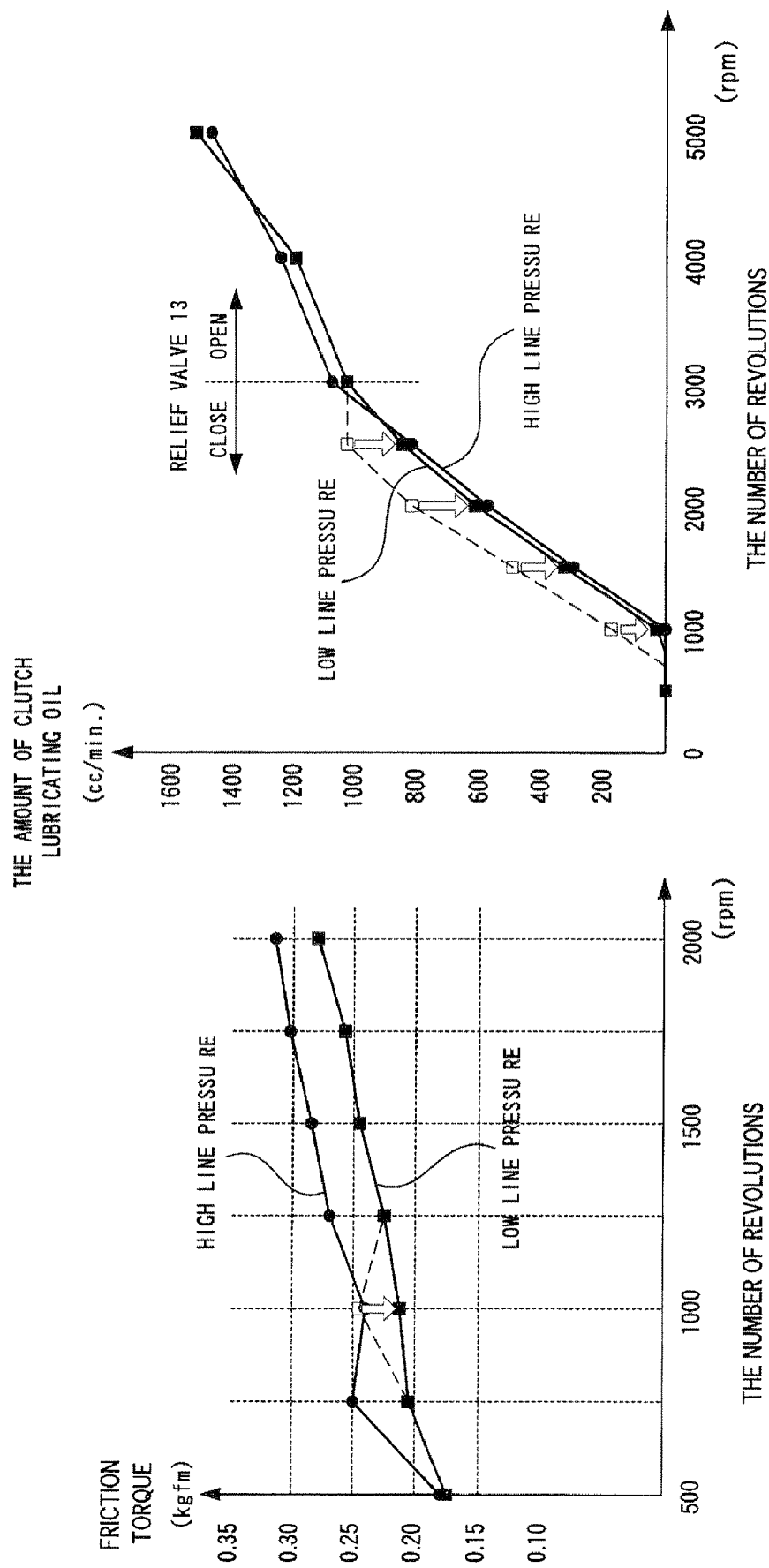
FIG. 5 is a graph showing a relation between the number of input revolutions, transmission friction torque and the amount of clutch lubricating oil in the automatic transmission according to the present invention.

FIG. 5 is a graph showing a relation between the number of input revolutions, transmission friction torque and the amount of clutch lubricating oil in the automatic transmission according to the present invention. FIG. 5A shows a relation between the number of input revolutions and friction torque of the automatic transmission, and FIG. 5B shows a relation between the number of input revolutions and the amount of clutch lubricating oil (the amount of lubricating oil) (here, as an example, the amount of lubricating oil when a gear is set to low). As shown in arrow(s) of the respective drawings, compared with the case where only the solenoid valve 12 is provided (see FIG. 2), by opening the control valve 14 even at the low input revolution, it is possible to reduce the amount of lubricating oil to the clutches to the same degree as that under high line pressure (normal operation). In addition, it is possible to effectively prevent increase of friction of the automatic transmission due to increase of the amount of lubricating oil. Therefore, fuel economy can be improved due to reduction of driving torque of the oil pump P. In this regard, FIG. 5B also shows timing when the relief valve 13 is shifted from closing to opening. In the present embodiment, as shown in FIG. 5B, the relief valve 13 opens to reduce the amount of lubricating oil when the number of revolutions Ne of the engine 1 becomes 3,000 rpm or more, for example.

Second Embodiment

Next, a second embodiment of a hydraulic control device for an automatic transmission according to the present invention will be described. In this regard, since a configuration of the overall vehicle is similar to that in FIG. 3, its explanation is omitted.

Figure 6:
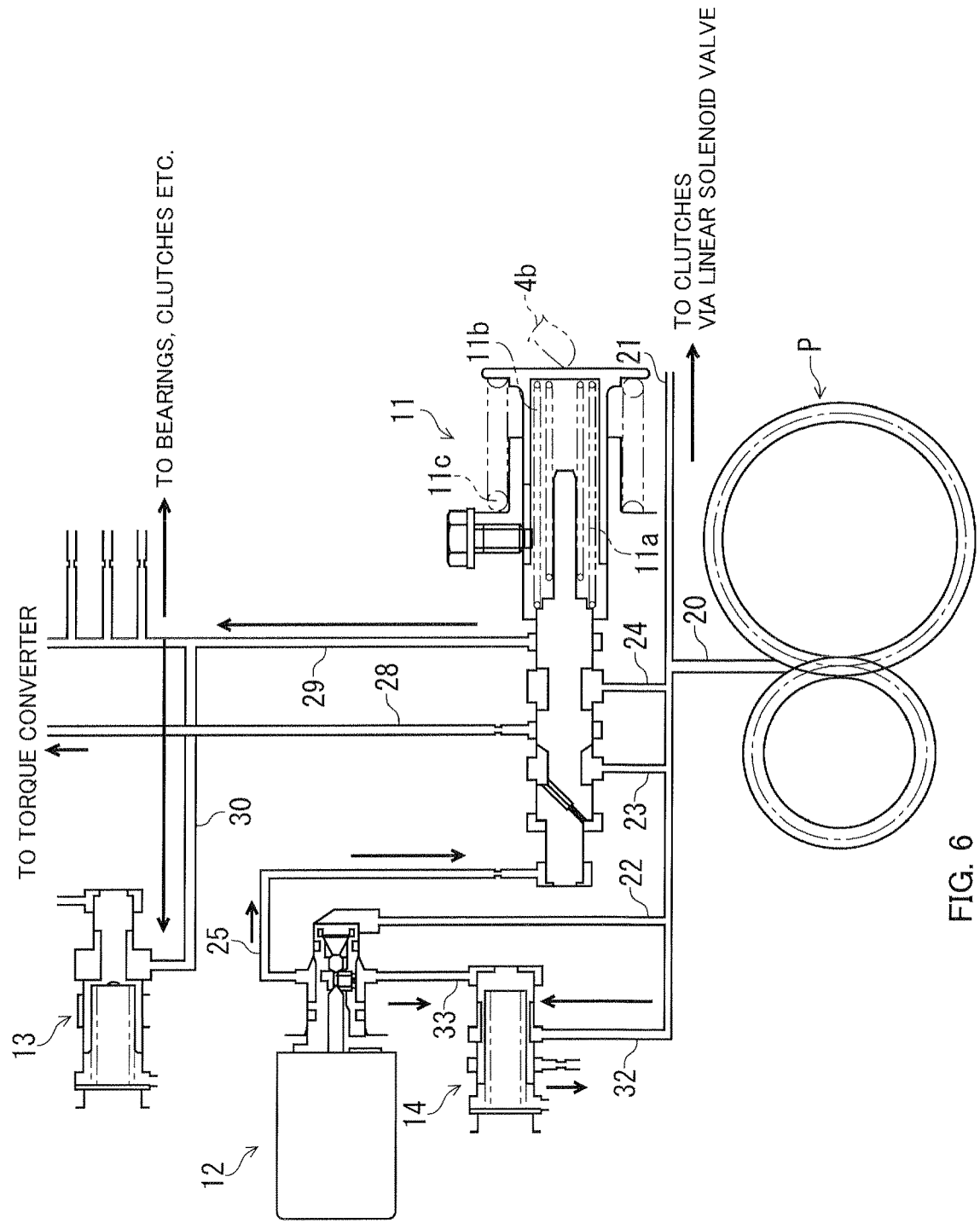
FIG. 6 is a part of a hydraulic circuit diagram of a hydraulic control device for an automatic transmission according to a second embodiment of the present invention.

FIG. 6 is a part of a hydraulic circuit diagram of a hydraulic control device for an automatic transmission according to a second embodiment of the present invention. Here, differences between the first embodiment and a second embodiment will be described mainly. The same reference numerals are assigned to components similar to those in the first embodiment described above, and detailed description thereof is omitted. In the hydraulic control device for the automatic transmission according to the present embodiment, an installation location of a control valve 14 is different from that in the hydraulic control device for the automatic transmission according to the first embodiment. Namely, in the present embodiment, the control valve 14 is provided between an oil passage 33 at one output of a solenoid valve 12 and an oil passage 32 of a line pressure oil passage that lies upstream of a lubricating oil passage via a regulator valve 11. The control valve 14 opens and closes by receiving hydraulic oil (signal pressure of low line pressure) supplied from the solenoid valve 12 through the oil passage 33.

An oil pump P suctions hydraulic oil from an oil tank (not shown in the drawings) to pump the suctioned hydraulic oil to an oil passage 20. This oil pressure is regulated to predetermined pressure by means of the regulator valve 11, and the regulated hydraulic oil is then fed to the respective clutches through an oil passage 21 and valves (not shown in the drawings) via linear solenoid valves. Here, when it becomes a region in which high engagement hydraulic oil pressure is not required, the hydraulic oil pressure of the hydraulic oil supplied from the oil pump P is received with an oil passage 22, and the solenoid valve 12 is opened (ON) in response to control of an electronic control unit (ECU; not show in the drawings) of the vehicle. Open of this solenoid valve 12 causes the regulator valve 11 to be controlled by the hydraulic oil fed through an oil passage 25 (signal pressure of the low line pressure) and the hydraulic oil fed through an oil passage 23. By making the pressure receiving area of the regulator valve 11 larger, the line pressure regulated by means of the regulator valve 11 is switched to low pressure.

In this case, the control valve 14 is controlled via the oil passage 33 by signal pressure of the low line pressure, whereby this control valve 14 is operated so as to open the oil passage 32, which lies upstream of a lubricating oil passage, in a line pressure oil passage. This causes the hydraulic oil whose pressure is switched to the low line pressure to be supplied from the oil pump P, to be fed through the oil passage 32 in the line pressure oil passage, and to be drained from the control valve 14 thus opened. Therefore, even in the state where line pressure is low and a relief valve 13 is not thereby opened, by opening the line pressure oil passage that lies upstream of the lubricating oil passage, the amount of lubricating oil supplied to the respective bearings and clutches can be reduced to the same degree as under high line pressure.

Further, when it becomes a region in which high engagement hydraulic oil pressure is required, the hydraulic control device for the automatic transmission according to the present embodiment carries out an operation to switch the line pressure from low pressure to high pressure. In this case, by closing the solenoid valve 12 in response to control of the electronic control unit (not shown in the drawings), the hydraulic oil (signal pressure of the low line pressure) is not supplied to the oil passage 25, and the regulator valve 11 is controlled by only the hydraulic oil fed through the oil passage 23. This makes the pressure receiving area of the regulator valve 11 smaller, whereby the line pressure is switched from low pressure to high pressure. Similarly, at this time, the hydraulic oil (signal pressure of the low line pressure) is not also supplied to the oil passage 33. Thus, the control valve 14 is closed, whereby open of the line pressure oil passage through the oil passage 32 is stopped. In this regard, when the number of input revolutions is high, the lubricating pressure becomes predetermined pressure. For this reason, the relief valve 13 is opened, whereby the amount of lubricating oil is also reduced under high line pressure.

Third Embodiment

Next, a third embodiment of a hydraulic control device for an automatic transmission according to the present invention will be described. In this regard, since a configuration of the overall vehicle is similar to that in FIG. 3, its explanation is omitted as well as the second embodiment.

Figure 7:
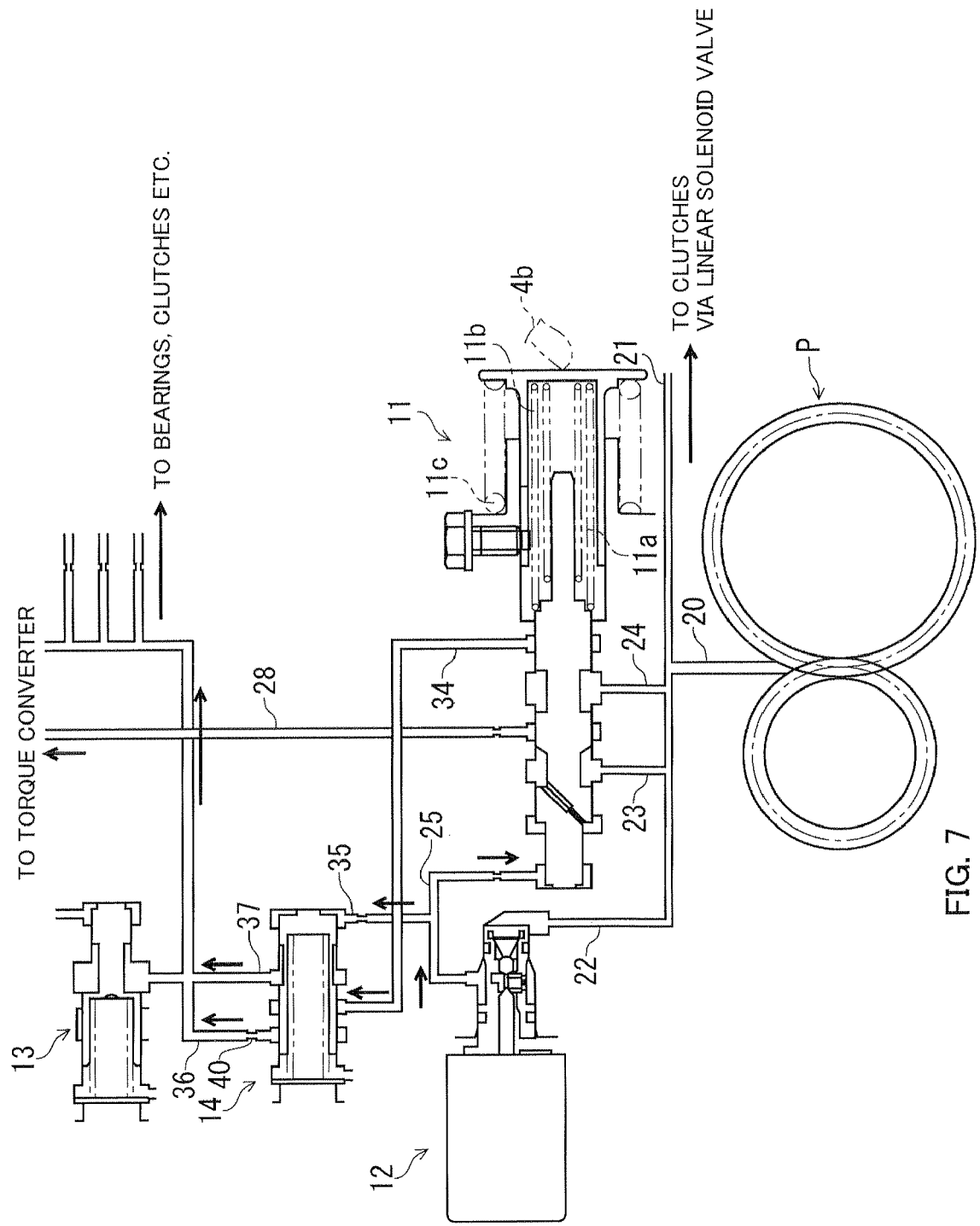
FIG. 7 is a part of a hydraulic circuit diagram of a hydraulic control device for an automatic transmission according to a third embodiment of the present invention.

FIG. 7 is a part of a hydraulic circuit diagram of a hydraulic control device for an automatic transmission according to a third embodiment of the present invention. Here, differences between the first and second embodiments and a third embodiment will be described mainly. The same reference numerals are assigned to components similar to those in the first embodiment described above, and detailed description thereof is omitted. In the hydraulic control device for the automatic transmission according to the present embodiment, an installation location of a control valve 14 and the number of output ports thereof are different from those in the hydraulic control device for the automatic transmission according to the first and second embodiments. Namely, in the present embodiment, the control valve 14 is provided between an oil passage 34 that is a lubricating oil passage of the lubricating oil supplied from a regulator valve 11 and oil passages 36, 37 for feeding (or sending) the lubricating oil to a relief valve 13, respective bearings and clutches. In the present embodiment, as shown in FIG. 7, two oil passages 36 and 37 are provided at an output side of the control valve 14. A throttle by an orifice 40 for reducing the amount of lubricating oil flowing into this oil passage 36 is provided in the oil passage 36. The control valve 14 is a valve (that is, switching valve) that switches the oil passage at the output side from the oil passage 37 to the oil passage 36 by receiving the hydraulic oil (signal pressure of low line pressure) supplied from a solenoid valve 12 through an oil passage 35.

An oil pump P suctions hydraulic oil from an oil tank (not shown in the drawings) to pump the suctioned hydraulic oil to an oil passage 20. This oil pressure is regulated to predetermined pressure by means of the regulator valve 11, and the regulated hydraulic oil is then fed to the respective clutches through an oil passage 21 and valves (not shown in the drawings) via linear solenoid valves. Here, when it becomes a region in which high engagement hydraulic oil pressure is not required, the hydraulic oil pressure of the hydraulic oil supplied from the oil pump P is received with an oil passage 22, and the solenoid valve 12 is opened (ON) in response to control of an electronic control unit (ECU; not show in the drawings) of the vehicle. Open of this solenoid valve 12 causes the regulator valve 11 to be controlled by the hydraulic oil fed through an oil passage 25 (signal pressure of the low line pressure) and the hydraulic oil fed through an oil passage 23. By making the pressure receiving area of the regulator valve 11 larger, the line pressure regulated by means of the regulator valve 11 is switched to low pressure.

In this case, the control valve 14 is controlled via the oil passage 35 by signal pressure of the low line pressure, whereby this control valve 14 is operated so as to switch the lubricating oil passage of the output side of the control valve 14 from the oil passage 37 to the oil passage 36. This causes the hydraulic oil to be fed through the oil passage 34 in the lubricating oil passage and to be outputted to the oil passage 36 side via the control valve 14. Thus, the amount of lubricating oil flowing into the lubricating oil passage is directly reduced by means of the throttle by the orifice 40. Therefore, even in the state where line pressure is low and the relief valve 13 is not thereby opened, the amount of lubricating oil supplied to the respective bearings and clutches can be reduced as well as under high line pressure.

Further, when it becomes a region in which high engagement hydraulic oil pressure is required, the hydraulic control device for the automatic transmission according to the present embodiment carries out an operation to switch the line pressure from low pressure to high pressure. In this case, by closing the solenoid valve 12 in response to control of the electronic control unit (not shown in the drawings), the hydraulic oil (signal pressure of the low line pressure) is not supplied to the oil passage 25, and the regulator valve 11 is controlled by only the hydraulic oil fed through the oil passage 23. This makes the pressure receiving area of the regulator valve 11 smaller, whereby the line pressure is switched from low pressure to high pressure. Similarly, at this time, the hydraulic oil (signal pressure of the low line pressure) is not also supplied to the oil passage 35. Thus, the lubricating oil passage of the output side of the control valve 14 is switched from the oil passage 36 in which the orifice 40 is provided to the oil passage 37, whereby the throttle of the lubricating oil passage by the orifice 40 is stopped. In this regard, when the number of input revolutions is high, the lubricating pressure becomes predetermined pressure. For this reason, the relief valve 13 is opened, whereby the amount of lubricating oil is also reduced under high line pressure.

As explained above, according to the hydraulic control device for the automatic transmission of the present invention, the hydraulic control device is configured so as to include: the regulator valve 11 that regulates the base oil pressure of the hydraulic oil supplied from the oil pump P on the basis of the stator reaction force of the torque converter T, and generates line pressure, which becomes the original pressure of the engagement hydraulic oil pressure of the frictional engagement element; the relief valve 13 provided in the lubricating oil passage, which lies at the output side of the regulator valve 11, the relief valve 13 opening when the lubricating pressure becomes the predetermined pressure to reduce the amount of lubricating oil; and the solenoid valve 12 for supplying auxiliary pressure to the regulator valve 11 and the control valve 14 that operates by the oil pressure supplied from the solenoid valve 12, as a line pressure switching section that sets up the line pressure to low pressure in the region in which the engagement hydraulic oil pressure does not require high engagement hydraulic oil pressure depending upon an operation state of the vehicle, and sets up the line pressure to high pressure when a target value of the engagement hydraulic oil pressure exceeds the predetermined pressure. Thus, even in the case where the number of input revolutions is low in the state where the line pressure is switched to the low pressure, the amount of lubricating oil can be reduced by opening the control valve 14 or switching to the oil passage in which the orifice 40 is provided. Therefore, driving torque of the oil pump P can be reduced and friction torque of the automatic transmission can also be reduced. This makes it possible to improve fuel economy of the vehicle.

Further, the control valve 14 constituting the line pressure switching section may be provided in the lubricating oil passage connected from the regulator valve 11 or may be provided in the line pressure oil passage that lies upstream of the lubricating oil passage via the regulator valve 11. Even in each case, the solenoid valve 12 opens when the line pressure is low pressure, whereby the lubricating oil passage or the line pressure oil passage is caused to open. This makes it possible to reduce the amount of lubricating oil as a whole. Further, the control valve 14 may be provided in the lubricating oil passage, and have two output ports at one of which the orifice 40 is provided. In this case, the control valve 14 may supply the lubricating oil from the output port at which the orifice 40 is provided to reduce the amount of lubricating oil by operating by means of the solenoid valve 12 when the line pressure is low pressure.

As described above, although the embodiments of the hydraulic control device for the automatic transmission according to the present invention have been explained in detail on the basis of the appending drawings, the present invention is not limited to these configurations. Various modifications can be made in a scope of the technical idea described in the following claims, the specification described above and the appending drawings without departing from the spirit and scope of the present invention. In this regard, even any shape, structure and function that is not described directly in the specification and the drawings falls within the technical idea of the present invention so long as the function and the effect of the present invention are achieved. Namely, each component constituting the hydraulic control device for the automatic transmission (including the oil pressure control circuit) can be replaced with any arbitrary component that can achieve the similar function to the corresponding component of the hydraulic control device for the automatic transmission. Further, arbitrary components may be added to the hydraulic control device for the automatic transmission.

What is claimed is:

1. A hydraulic control device for an automatic transmission of a vehicle, the vehicle including a hydraulic torque converter and an automatic transmission connected to the torque converter, the automatic transmission having a plurality of frictional engagement elements, the hydraulic control device be capable of setting up any gear from a plurality of gears by causing any one of the plurality of frictional engagement elements to selectively carry out an engagement operation, the hydraulic control device comprising:

a regulator valve that regulates base oil pressure of hydraulic oil supplied from an oil pressure source on the basis of stator reaction force of the torque converter to generate a line pressure, the line pressure becoming an original pressure of engagement hydraulic oil pressure for the frictional engagement elements;

a relief valve provided in a lubricating oil passage connected from the regulator valve, the relief valve opening to reduce the amount of lubricating oil when an oil pressure in the lubricating oil passage reaches a predetermined pressure;

a solenoid valve that supplies an auxiliary pressure to the regulator valve to set the line pressure from a high line pressure to a low line pressure in a region in which the engagement hydraulic oil pressure does not require a high engagement hydraulic oil pressure depending upon an operation state of the vehicle, the solenoid valve stopping the supply of the auxiliary pressure to the regulator valve to set up the line pressure from the low line pressure to the high line pressure when a target value of the engagement hydraulic oil pressure exceeds the predetermined pressure, wherein the high line pressure is greater than the low line pressure; and a control valve that operates in accordance with the auxiliary pressure supplied from the solenoid valve to reduce the amount of lubricating oil even though the oil pressure in the lubricating oil passage does not reach the predetermined pressure.

2. The hydraulic control device as claimed in claim 1, wherein the control valve is provided in the lubricating oil passage, and the control valve opens the lubricating oil passage to reduce the amount of lubricating oil at the same time when the line pressure is set up to the low line pressure by means of the solenoid valve.

3. The hydraulic control device as claimed in claim 1, wherein the control valve is provided in a line pressure oil passage that lies upstream of the lubricating oil passage via the regulator valve, and the control valve opens the line pressure oil passage to reduce the amount of lubricating oil by operating by means of the solenoid valve at the same time when the line pressure is set up to the low line pressure by means of the solenoid valve.

4. The hydraulic control device as claimed in claim 1, wherein the control valve is provided in the lubricating oil passage, the control valve has two output ports at one of which an orifice is provided, and the control valve supplies the lubricating oil from the output port at which the orifice is provided to reduce the amount of lubricating oil by operating by means of the solenoid valve at the same time when the line pressure is set up to the low line pressure by means of the solenoid valve.

* * * * *